United States Patent [19]
Wilson et al.

[11] Patent Number: 4,616,314
[45] Date of Patent: Oct. 7, 1986

[54] MICROCOMPUTER CONTROLLED DATA RECEIVER

[75] Inventors: James L. Wilson, Schaumburg; Shannon Edwards, Marengo, both of Ill.

[73] Assignee: Motorola, Inc., Schaumburg, Ill.

[21] Appl. No.: 493,919

[22] Filed: May 12, 1983

[51] Int. Cl.⁴ .............................................. G06F 7/38
[52] U.S. Cl. ................................................... 364/200
[58] Field of Search ... 364/200 MS File, 900 MS File; 455/62, 54, 137; 371/37, 40

[56] References Cited

U.S. PATENT DOCUMENTS

| | | | |
|---|---|---|---|
| 3,781,818 | 12/1973 | Pardoe et al. | 364/900 |
| 4,220,820 | 4/1980 | Mallien, II | 364/900 |
| 4,271,518 | 6/1981 | Birzel et al. | 371/37 |
| 4,314,334 | 2/1982 | Daugnten et al. | 364/200 |
| 4,384,362 | 5/1983 | Leland | 455/54 |
| 4,413,319 | 11/1983 | Schultz | 364/200 |
| 4,481,670 | 11/1984 | Freeburg | 455/62 |
| 4,525,861 | 6/1985 | Freeburg | 455/137 |

Primary Examiner—Thomas M. Heckler
Attorney, Agent, or Firm—Rolland R. Hackbart

[57] ABSTRACT

A data receiver is described that includes a microcomputer that is coupled to a self-clocking asynchronous data bus. The data bus includes three signal lines TDATA, CDATA and RDATA. Bits of a data block are detected by a first exclusive-OR gate that is coupled to the TDATA and CDATA lines. An interrupt control signal and the output of the first exclusive-OR gate are coupled to a second exclusive-OR gate that generates an interrupt signal. The interrupt signal is coupled to the interrupt input of the receiving microcomputer. The receiving microcomputer is interrupted in response to a data bit and then changes the binary state of the interrupt control signal for producing an interrupt for the idle state between data bits. Upon being interrupted by the idle state between data bits, the receiving microcomputer changes the binary state of the interrupt control signal for producing an interrupt for the next data bit and also applies a bit of return data to the RDATA line. The received data block may include an address and a data portion.

8 Claims, 9 Drawing Figures

MICROCOMPUTER CONTROLLED DATA RECEIVER

BACKGROUND OF THE INVENTION

The present invention is generally related to data receivers, and more particularly to an improved microcomputer controlled data receiver.

In prior art data receivers, it is necessary to recover a clock signal from a self-clocking data bus before the data thereon can be received. For example, in the self-clocking data transmission system described in U.S. Pat. No. 4,369,516, two data signals are utilized to transmit self-clocking data from a data transmitter to a data receiver. The data receivers include circuitry which derives a bit clock signal that clocks data into a receiving register. However, the use of separate circuitry for receiving self-clocking data is undesirable in microcomputer controlled data receivers.

OBJECTS AND SUMMARY OF THE INVENTION

Accordingly, it is an object of the present invention to provide an improved microcomputer controlled data receiver that receives self-clocking data with a minimum of external circuitry.

Briefly described, the present invention encompasses apparatus for receiving a block of binary, self-clocking data bits from first and second data signals from a signal source, such as, for example, a transmitting microcomputer. According to the self-clocking format for a block of data bits, the first and second data signals have a second binary state (first binary state for an alternative embodiment) before and after the block of data bits. The first data signal has a second binary state and the second data signal has a first binary state for data bits having a binary zero state, and the first data signal has a first binary state and the second data signal has a second binary state for data bits having a binary one state. In between successive data bits, the first and second data signals have a first binary state (second binary state for the alternative embodiment). In the preferred embodiment of the invention, the first binary state is a binary one state, and the second binary state is a binary zero state.

The receiving apparatus, which may be a suitably programmed receiving microcomputer, includes circuitry for generating a data transition signal having a first binary state when the first and second data signals have different binary states and otherwise having a second binary state, circuitry for generating an interrupt signal having a first binary state when the data transition signal and an interrupt control signal have the same binary state and otherwise having a second binary state, and processing circuitry for producing the interrupt control signal. The processing circuitry is responsive to the first binary state of the interrupt signal and a first binary state of the interrupt control signal for storing a data bit and is further responsive to the first binary state of the interrupt signal for changing the binary state of the interrupt control signal.

The present invention further encompasses a method for receiving the block of binary data bits from the first and second data signals. The receiving method comprises the process steps of generating a data transition signal having a first binary state when the first and second data signals have different binary states and otherwise having a second binary state, interrupting processing circuitry, such as a microcomputer, when the data transition signal and an interrupt control signal provided by the processing circuitry have the same binary state, storing the binary state of a data bit in the processing circuitry in response to said interrupting step and a first binary state of the interrupt control signal, and changing the binary state of the interrupt control signal in response to said interrupting step.

DETAILED DESCRIPTION OF THE PREFERRED EMBODIMENT

Figure 1:
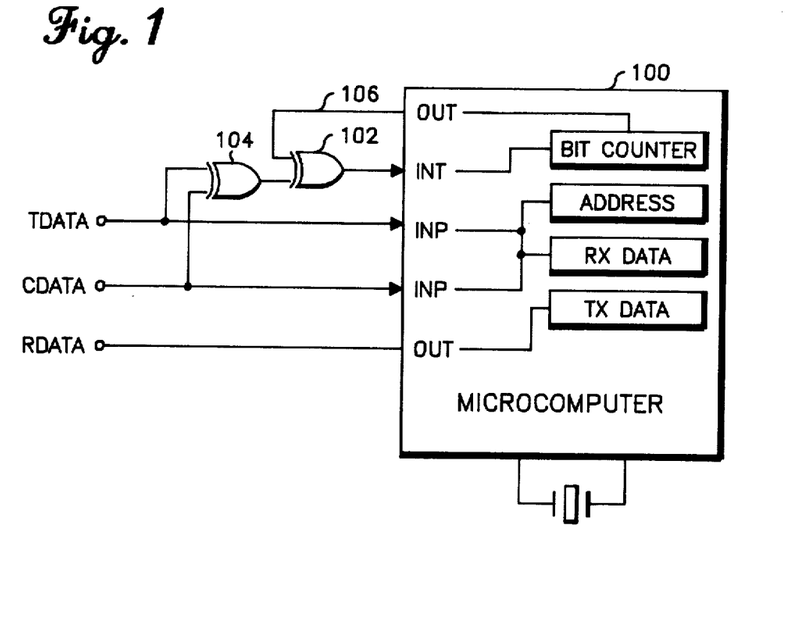
FIG. 1 is a circuit diagram of data processing circuitry embodying the present invention.

In FIG. 1, there is illustrated a circuit diagram of data processing circuitry embodying the present invention. A data processor or microcoputer 100 is coupled to a three-wire data bus, TDATA, CDATA, and RDATA, of the type described in the aforementioned U.S. Pat. No. 4,369,516. The three-wire data bus provides a self-clocking asynchronous data link between a transmitting microcomputer (not shown) and a receiving microcomputer 100, which may be co-located or located at a distance from one another. For example, in radiotelephone applications, one microcomputer may be located in the handset of the radiotelephone control unit and the other microcomputer may be located in the cradle (or in the radio). The use of a three-wire bus in radioetelephone applications is particularly advantageous since it is highly desirable to reduce the number of wires between the handset and the cradle (or radio).

Data is preferably transmitted in blocks on the TDATA and CDATA signal lines from the transmitting microcomputer to the receiving microcomputer 100. The receiving microcomputer 100 can transmit data back to the transmitting microcomputer on the RDATA signal line. In the preferred embodiment, a data block consists of eight bits of address followed by eight bits of data. A data block on the RDATA signal line consists of eight bits of data and is transmitted in synchronism with receipt of the data portion of the data block from the transmitting microcomputer. The address portion of the data block may be utilized by the receiving microcomputer 100 for determining which data is to be returned on the RDATA signal line or for determining where the data portion of the data block is to be stored in or used by the receiving microcomputer 100.

In radiotelephone applications, the transmitting microcomputer may be located in the cradle of the radiotelephone control unit, and the receiving microcomputer 100 may be located in the handset of the radiotelephone control unit. A suitable radiotelephone control unit is described together with a suitable radio telephone transceiver in Motorola Instruction Manual Number 68P81039E25, entitled "Advanced Mobile Phone System 800 mHz High Capacity Mobile Radiotelephone", published by Technical Writing Services, Motorola, Inc., 1301 E. Algonquin Road, Schaumburg, Ill., 1979. The receiving microcomputer 100 in the handset communicates information via the three-wire bus as to which pushbuttons have been actuated and what data is being displayed. If an actuated pushbutton has been detected by the receiving microcomputer 100 in the handset, a binary one is placed on the RDATA signal line to notify the transmitting microcomputer in the cradle that new information is available. The transmitting microcomputer in the cradle will then send a data block to the receiving microcomputer 100 in the handset, which returns the new information on the RDATA signal line.

According to the present invention, receiving microcomputer 100 is interrupted in response to each bit of the data block that is transmitted on the TDATA and CDATA signal lines. Microcomputer 100 is interrupted in response to a low-going transition of the signal that is applied to its interrupt input. In FIG. 1, the interrupt input of microcomputer 100 is coupled to the output of exclusive-OR gate 102. The output exclusive-OR gate 102 is the interrupt signal. Bits of a data block are detected by first exclusive-OR gate 104 that is coupled to the TDATA and CDATA lines. The output of exclusive-OR gate 104 is the data transition signal. An interrupt control signal 106 and the output of first exclusive-OR gate 104 are coupled to second exclusive-OR gate 102 that generates the interrupt signal. The interrupt signal is coupled to the interrupt input of the receiving microcomputer 100. The receiving microcomputer 100 is interrupted in response to a data bit and then changes the binary state of the interrupt control signal 106 for producing an interrupt for the idle state between data bits. Upon being interrupted by the idle state between data bits, the receiving microcomputer 100 changes the binary state of the interrupt control signal 106 for producing an interrupt for the next data bit and also applies a bit of return data to the RDATA line. Microcomputer 100 may be any suitable commercially available microcomputer, such as, for example, the Intel type 8048 microcomputer or the Motorola type MC6805 microcomputer. When microcomputer 100 is interrupted, program control is transferred to the interrupt computer program stored therein.

Figure 2:
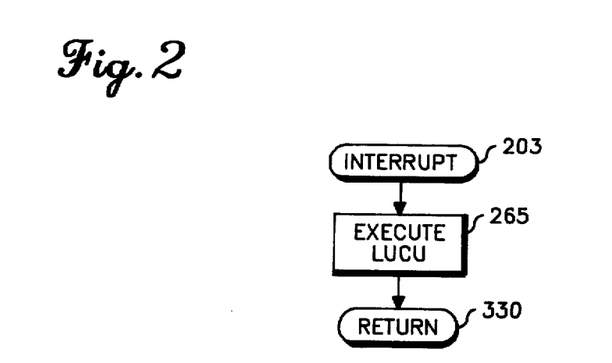
FIG. 2 is a general flow chart of a computer program that is executed when the data processing circuitry in FIG. 1 is interrupted.

FIG. 2 illustrates a general flow chart of the computer program that is executed when microcomputer 100 is interrupted. At block 203, program control is transferred to the interrupt location, which is hexadecimal address 003 in the preferred embodiment. Next, at block 265, microcomputer 100 executes the computer program labeled LUCU. In the preferred embodiment, the LUCU computer program includes a number of sub-programs for receiving a data block transmitted between the transmitting microcomputer in the cradle and the receiving microcomputer in the handset of a radiotelephone control unit. These programs also provide for the transmission of data from the receiving microcomputer back to the transmitting microcomputer by way of the RDATA signal line. Since an interrupt is generated for each data bit, these computer programs are likewise executed for each data bit. Upon completion of these computer programs, program control of microcomputer 100 returns at block 330 to the performance of other computer programs, such as, for example, computer programs that scan the keyboard for actuated pushbuttons and that display selected data.

Referring next to FIGS. 3 through 9, there are illustrated detailed flow charts of the computer programs that are executed by microcomputer 100 in response to an interrupt. The flow charts in FIGS. 3 through 9 provide a routineer skilled in the art with the detailed process steps from which the actual computer instructions of a given microcomputer can be readily coded. By way of analogy to an electrical circuit diagram, the flowcharts in FIGS. 3 through 9 are equivalent to a detailed schematic for an electrical circuit where provision of the exact part values for electrical circuit components corresponds to provision of the actual computer instructions for blocks in the flowcharts.

Figure 3:
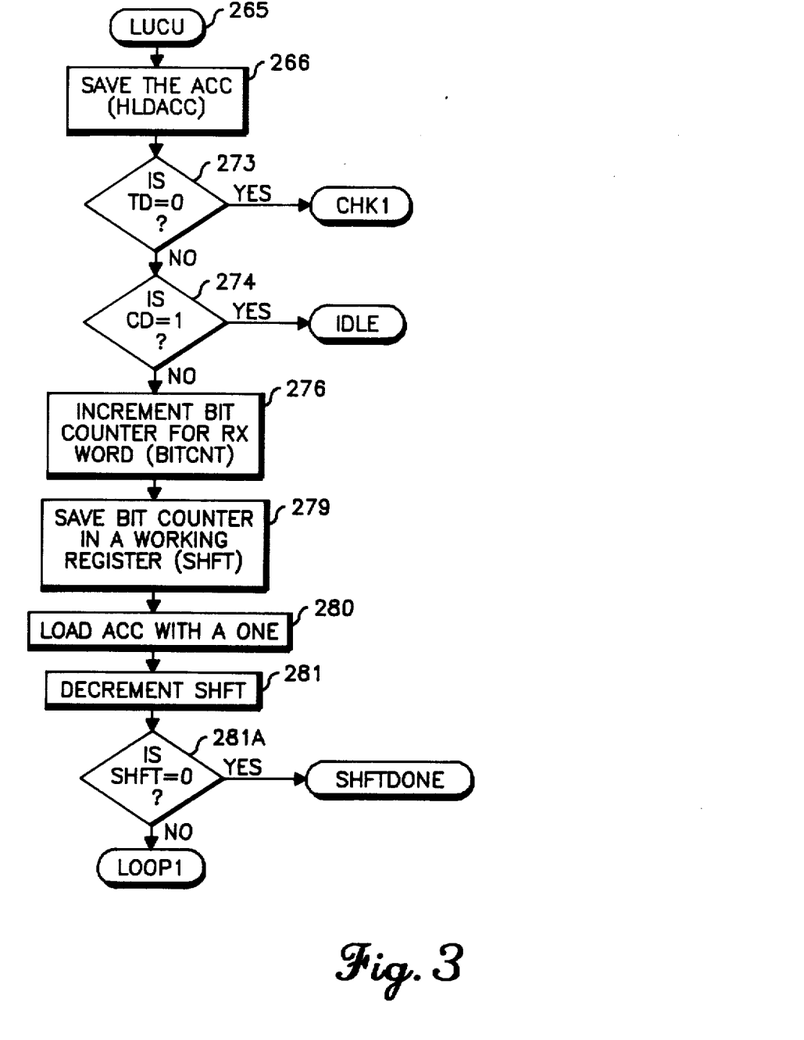
FIGS. 3 through 9 are detailed flow charts of the computer programs executed by the data processing circuitry in FIG. 1 in response to an interrupt.

Referring to FIG. 3, there is illustrated a computer program labelled LUCU that is executed by microcomputer 100 during an interrupt. The LUCU program is executed for interrupts generated at the beginning of a data bit and at the beginning of the idle state between data bits. Starting at block 265, program control proceeds to block 266 where the contents of the accumulator ACC are saved in location HLDACC. The contents of the accumulator will be restored when returning from the interrupt computer programs.

Next, at decision block 273, a check is made to see if TD has a binary zero state. The variable TD is the TDATA signal, and the variable CD is the CDATA signal. If TD has a binary zero state, YES branch is taken to the CHK1 computer program in FIG. 5 to determine if a binary zero data bit has been received or the end of a data block has been reached. Otherwise, NO branch is taken to decision block 274. In decision block 274, a check is made to see if CD has a binary one state. If CD has a binary one state, YES branch is taken to the IDLE computer program in FIG. 7 since the idle state between data bits has been detected.

If CD does not have a binary one state, NO branch is taken from decision block 274 to block 276 where the bit counter BITCNT is incremented by one since a binary one data bit has been received. Next, at block 279, the bit counter is saved in working register SHFT. The accumulator ACC is then loaded with a binary one at block 280. The register SHFT is then decremented by one at block 281. Next, at decision block 281A, a check is made to see if SHFT has a binary zero state. If so, YES branch is taken to the SHFTDONE computer program in FIG. 6. Otherwise, NO branch is taken to the LOOP1 computer program in FIG. 4. Upon initially receiving a data block, the bit counter BITCNT is set equal to zero and is incremented by one each time a bit of the data block is received.

Figure 4:
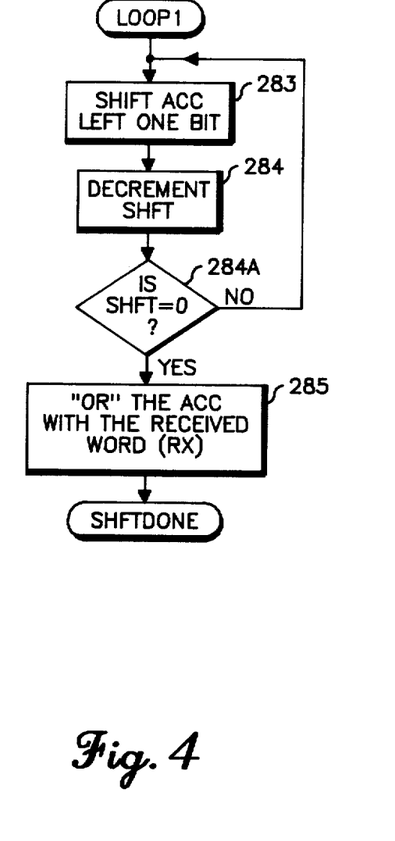

Referring to FIG. 4, there is illustrated the LOOP1 computer program. At block 283, the accumulator ACC is shifted left by one bit. Next, at block 284, SHFT is decremented by one. Proceeding to decision block 284A, a check is made to see if SHFT has a binary zero state. If not, NO branch is taken back to block 283 where the accumulator ACC is shifted left by one bit again. If SHFT is equal to zero, the received data bit has been shifted into its proper location in the incoming data block, and YES branch is taken from decision block 284 to block 285 where the accumulator ACC is ORed with the received data word RX. This operation places the new data bit in its proper location in the received data word RX. Next, program control proceeds to the SHFTDONE computer program in FIG. 6.

Figure 5:
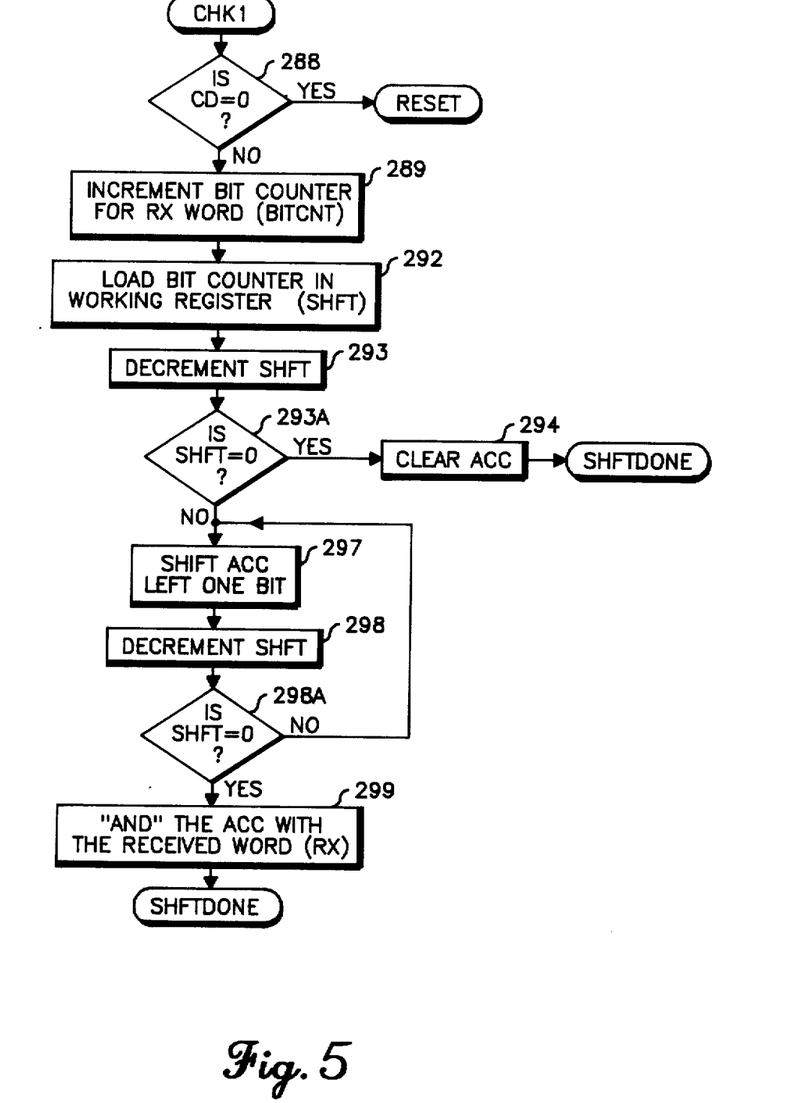

Referring to FIG. 5, there is illustrated the CHK1 computer program. The CHK1 computer program is reached from decision block 273 in FIG. 3 if TD has a binary zero state. At decision block 288, a check is made to see if CD also has a binary zero state. If so, YES branch is taken to the RESET computer program in FIG. 8. The RESET computer program is executed at the end of a data block, that is when both TD and CD have a binary zero state.

If CD does not have a binary zero state, NO branch is taken from decision block 288 to block 289 where the bit counter BITCNT is incremented by one since a binary zero data bit has been received. Next, at block 292, the bit counter BITCNT is loaded into working register SHFT. Thereafter, SHFT is decremented by one at block 293. Then, at decision block 293A, a check is made to determine if SHFT has a binary zero state. If so, YES branch is taken to block 294 where the accumulator ACC is cleared and program control transfers to the SHFTDONE computer program in FIG. 6. The YES branch from decision block 293A is taken for the first bit of a data block.

If SHFT does not have a binary zero state, NO branch is taken from decision block 293A to block 297 where the accumulator ACC is shifted left by one bit. Then, at block 298 SHFT is decremented by one. Next, at decision block 298A, a check is made to see if SHFT is equal to zero. If not, NO branch is taken back to block 297 where the accumulator ACC is shifted left by one bit again. If SHFT is equal to zero, YES branch is taken from decision block 298A to block 299 where the accumulator ACC is ANDed with the received data word RX. Since the received data bit has a binary zero state, ANDing the received data bit with the received data word RX places the binary zero bit into the received data word in its proper bit location. Program control then proceeds to the SHFTDONE computer program in FIG. 6.

Figure 6:
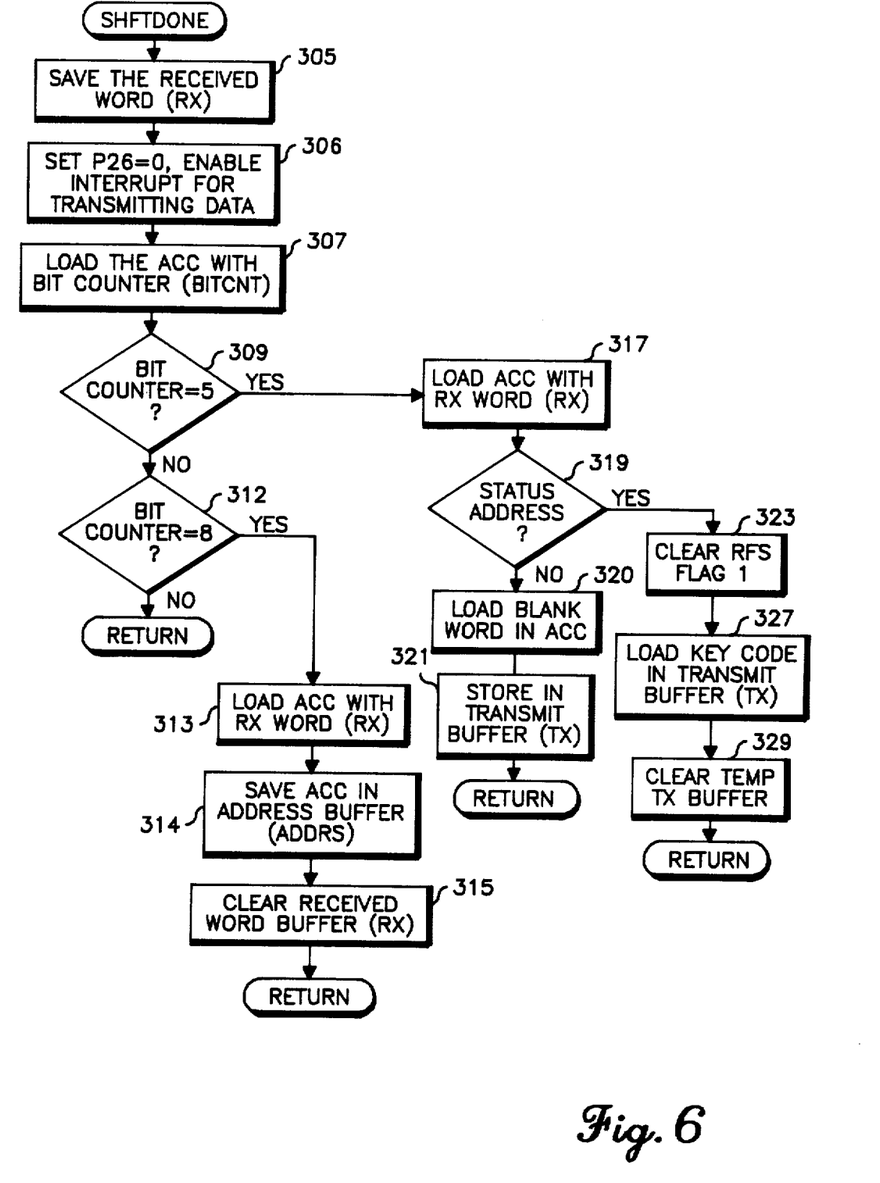

Referring to FIG. 6, there is illustrated a detailed flow chart for the SHFTDONE computer program. The SHFTDONE computer program is entered after a data bit has been received and shifted into its proper position in the received data word RX. Proceeding to block 305, the received data word RX is saved in the microcomputer's memory. Next, at block 306, the interrupt control signal P26 is set equal to zero for allowing an interrupt to be generated by the idle state of the TDATA and RDATA signal lines. According to an important feature of the present invention, another interrupt will not be generated until the idle state is reached.

Next, at block 307 the accumulator is loaded with the bit counter BITCNT. The bit counter will be eight when the first eight bits representing the address portion of the data block have been received. The bit counter will be sixteen when the following eight bits representing the data portion of the data block have been received. Proceeding to decision block 309, a check is made to see if the bit counter is equal to five. If so, YES branch is taken to block 317 where the accumulator ACC is loaded with the received data word RX. The first five bits of the address portion of the data word are decoded in advance to determine, if possible, that a particular piece of data is to be sent by the receiving microcomputer 100 on the RDATA signal line. Proceeding to decision block 319, a check is made to determine if the first five bits of the data portion contain a predetermined status address. If so, YES branch is taken to block 323 where the request for service RFS FLAG 1 is cleared. Next, at block 327 the code for an actuated pushbutton key is loaded into the transmit buffer TX for subsequent transmission on the RDATA signal line. Then, at block 329, the temporary TX buffer is cleared, and thereafter program control returns from the interrupt computer programs.

If the first five bits of the data portion of the received data block do not contain the predetermined status address, NO branch is taken from decision block 319 to block 320 where a blank data word is loaded into the accumulator ACC. Next, at block 321, the blank word is also stored in the transmit buffer TX, and thereafter program control returns from the interrupt computer programs.

Returning back to decision block 309, if the bit counter is not equal to five, NO branch is taken to decision block 312 where a check is made to see if the bit counter is equal to eight. If not, NO branch is taken to return from the interrupt computer programs. Otherwise, YES branch is taken to block 313 where the accumulator ACC is loaded with the received data word RX. Next, at block 314, the accumulator ACC is loaded into the address buffer ADDRS. Since the bit counter is equal to eight, the entire address portion of the data block has been received and can be stored in the address buffer ADDRS. Then, at block 315, the buffer for the received data word RX is cleared in preparation for reception of the data portion of the data block. Thereafter, program control returns from the interrupt computer programs for processing any succeeding data bits of the data block.

Figure 7:
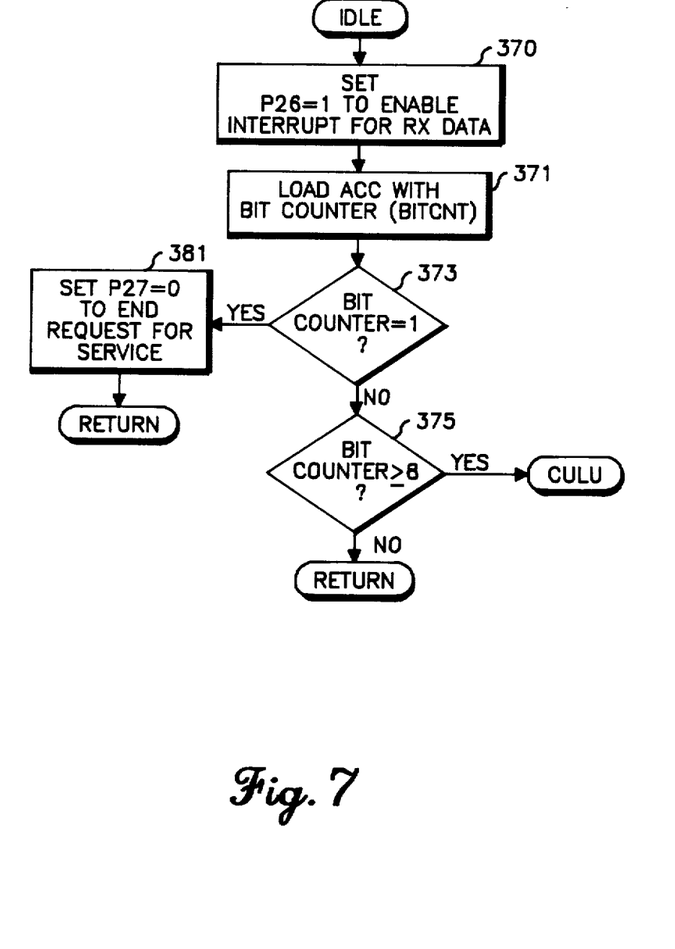

Referring to FIG. 7, there is illustrated a flow chart of the IDLE computer program which is entered from decision block 274 of FIG. 3 when the idle state between data bits has been detected. Proceeding to block 370, the interrupt control signal P26 is set equal to one for allowing an interrupt to be generated by a succeeding bit of the data block. Thus, according to the present invention, another interrupt will not be generated until the next data bit is reached.

Next, at block 371, the accumulator is loaded with the bit counter BITCNT. Then, at decision block 373, a check is made to determine if the bit counter is equal to one. If so, YES branch is taken to block 381 where the RDATA signal line P27 is set equal to zero for ending any pending requests for service RFS. Thereafter, program control returns from the interrupt programs. If the bit counter is not equal to one, NO branch is taken from decision block 373 to decision block 375 where a check is made to determine if the bit counter is greater than or equal to eight. If not, NO branch is taken to return from the interrupt computer programs. Otherwise, YES branch is taken to the LUCU computer program in FIG. 9 for placing a bit from the transmit buffer TX on the RDATA signal line.

Figure 8:
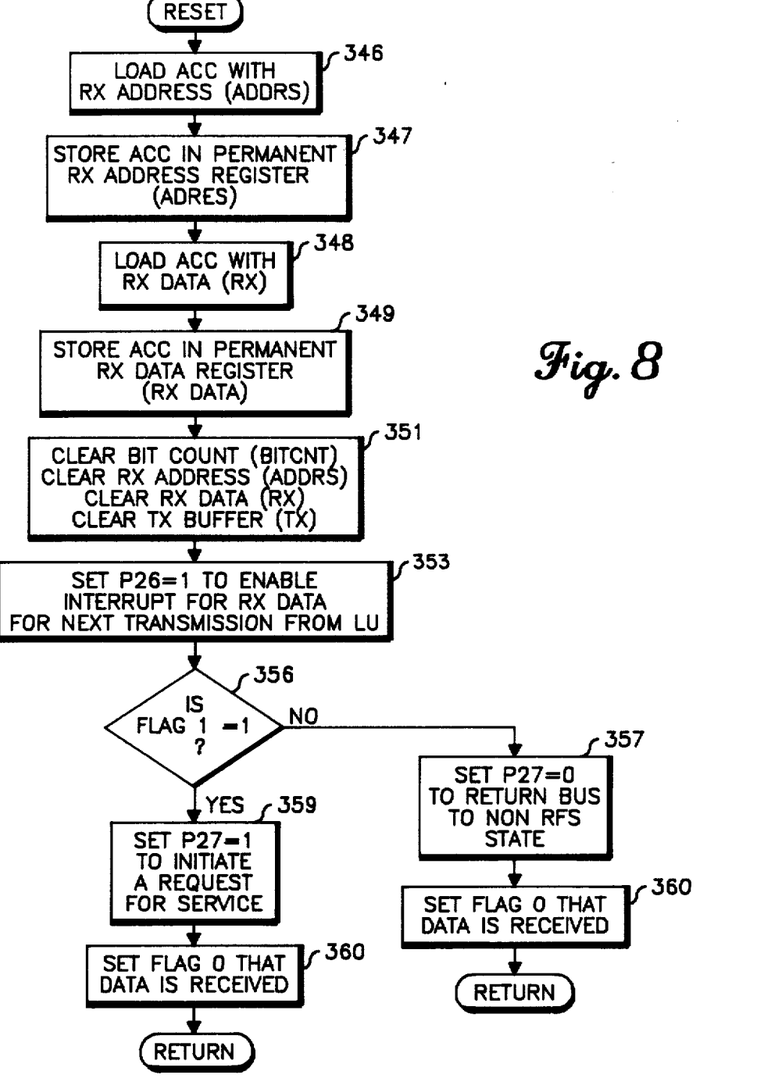

Referring to FIG. 8, there is illustrated a detailed flow chart of the RESET computer program which is entered from decision block 288 in FIG. 5 after a data block has been received by receiving microcomputer 100. Proceeding to block 346, the accumulator is loaded with the received address ADDRS. Then, at block 347, the contents of the accumulator are stored in a permanent received address register ADRES. Next, at block 348, the accumulator is loaded with the received data word RX. Then, at block 349, contents of the accumulator are stored in the permanent received data word register RX DATA. In preparation for receipt of a following data block, the bit counter BITCNT, the received address ADDRS, the received data word RX, and the transmit buffer TX are cleared at block 351. Then, at block 352, the interrupt control signal P26 is set equal to one to enable interrupts for the next data block transmission.

Finally, the request for service flag RFS FLAG 1, is checked at decision block 356 to see if it has a binary one state. If so, YES branch is taken to block 359 where the RDATA signal line is set equal to a binary one if another pushbutton has been actuated or the previous request has not been serviced. If not other pushbuttons have been actuated, the RDATA signal line is set to a binary zero state. Then, FLAG 0 is set equal to a binary one to indicate that a data block has been received. Thereafter, program control returns from the interrupt computer programs. If FLAG 1 is not equal to a binary one, NO branch is taken from decision block 356 to block 357 where the RDATA signal line P27 is set equal to zero. Then, at block 360, FLAG 0 is set to a binary one state to indicate that a data block has been received. Thereafter, program control returns from the interrupt computer programs. If another pushbutton is actuated, microcomputer 100 will again set the RDATA signal line to a binary one state for requesting that the transmitting microcomputer send a data block to ascertain which pushbutton has been actuated.

Figure 9:
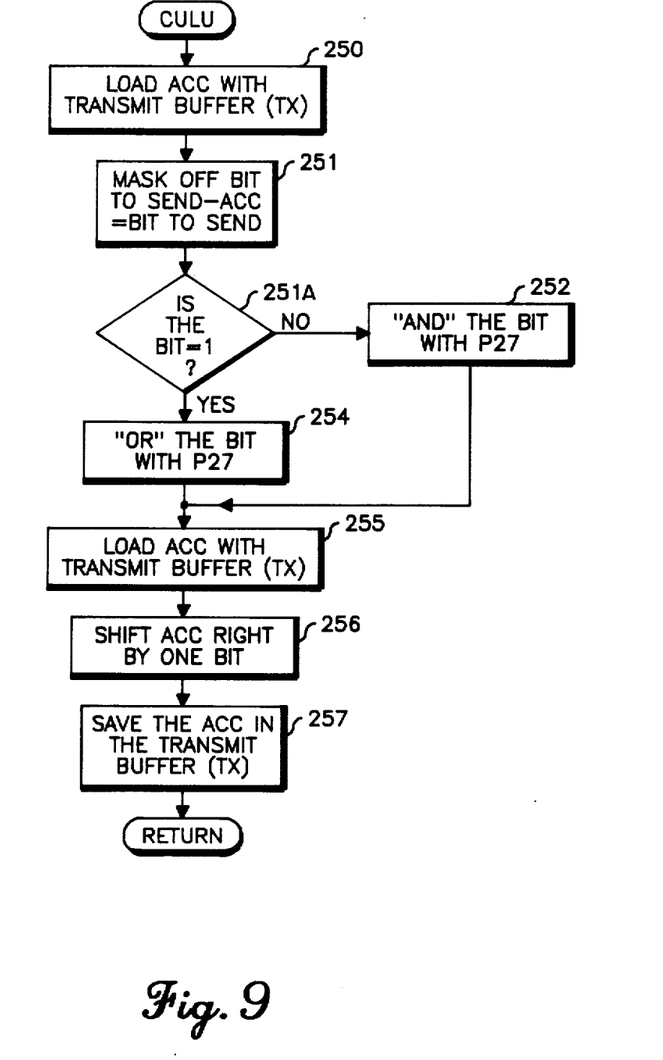

Referring to FIG. 9, there is illustrated a detailed flow chart for th CULU computer program that is executed from decision block 375 in FIG. 7 whenever the bit counter BITCNT is greater than or equal to eight. The bit counter is greater than or equal to eight when the data portion of a data block is being received. Proceeding to block 250, the accumulator ACC is loaded with the contents of the transmit buffer TX in preparation for applying a bit to the RDATA signal line. Next, at block 251, the low-order bit of the accumulator ACC is masked off. Then, at decision block 251A, a check is made to determine if the masked bit is equal to a binary one. If so, YES branch is taken to block 254 where the masked bit is ORed with P27, the output port for the RDATA signal line. Otherwise, NO branch is taken to block 252 where the masked bit is ANDed with P27. Next, at block 255 the accumulator ACC is loaded with the contents of the transmit buffer TX. Then, at block 256, the accumulator ACC is shifted right by one bit to place the next bit to be transmitted in the low order bit of the transmit buffer. Next, at block 257, the contents of the accumulator ACC are placed back into the transmit buffer TX, and thereafter program control returns from the interrupt computer programs. Once all eight bits of the data portion of the data block have been received, program control will transfer to the RESET computer program in FIG. 8 for preparing for reception of a succeeding data block.

In summary, an improved microcomputer controlled data receiver has been described that receives a block of self-clocking data bits from two data signal lines by interrupting the receiving microcomputer in response to each data bit. Since interrupts are generated by each bit, the speed of data transmission can vary from bit to bit, or can be interrupted for varying time intervals without affecting data reception. Moreover, the interrupts can further be utilized by the microcomputer controlled data receiver to synchronize return data. The improved data receiver of the present invention can be advantageously utilized in any suitable microcomputer embodiment for receiving self-clocking asynchronous data with a minimum of external circuitry.

APPENDIX

The following computer programs have been coded from the flow charts in FIGS. 2 through 9 in the mnemonic language of an Intel type 8048 microcomputer. Reference numbers of blocks of the flow charts in FIGS. 2 through 9 correspond to similarly numbered instructions in the computer programs. The computer programs are included to illustrate that the operations in blocks of these flow charts provide a routineer skilled in the art with sufficient information to readily code microcomputer instructions for each block thereof. Referring to the following computer programs, the first column is the instruction number, the second column is the label, and the third column is the instruction code followed by comments after the semicolon.

```
instruction number, the second column is the label, and
the third column is the instruction code followed by
comments after the semicolon.

;BANK 0 REGISTERS

12      SHFT    EQU     R1      ;TEMPORARY LOCATION FOR
                                 BIT COUNT

14      BITCNT  EQU     R2      ;RECEIVED BIT COUNT

15      HLDACC  EQU     R3      ;TEMP ACC STORAGE

16      TX      EQU     R4      ;DATA TO TRANSMIT

17      ADRES   EQU     R5      ;RECEIVED ADDRESS

18      RXDATA  EQU     R6      ;RECEIVED DATA

19      RX      EQU     R7      ;INCOMING RECEIVED DATA
```

;PART OF 3 WIRE ROUTINE-LU TO CU

```
250   CULU     MOV    A,TX          ;TX DATA IN ACC
251            JB0    SET           ;IS BIT 0 A 1 OR 0?
252            ANL    P2,#7FH       ;SET P27 TO A 0
253            JMP    OUTDONE
254   SET      ORL    P2,#80H       ;SET P27 TO A 1
255   OUTDONE  MOV    A,TX          ;LOAD ACC WITH WORD TO TRANSMIT
256            RR     A             ;SHIFT TX 1 BIT
257            MOV    TX,A          ;SAVE WORD
258   RETRNN   JMP    RETRN         ;RETURN FROM INTERRUPT
259   IDL      JMP    IDLE
260   REST     JMP    RESET
```

;PART OF 3 WIRE ROUTINE-LU TO CU

```
265   LUCU     SEL    RB0           ;RAM BANK 0
266            MOV    HLDACC,A      ;SAVE ACC
267            MOV    A,R1
268            MOV    R1,#STOREG
269            MOV    @R1,A         ;R1 INTO TEMP STORAGE
270            INC    R1
271            MOV    A,R0
272            MOV    @R1,A         ;R0 INTO TEMP STORAGE
273            JNT0   CHK1          ;IF T0=0, RX BIT=0 OR
                                    ;RESET BIT
274            JT1    IDL           ;IF T0 & T1=1, IDLE BIT-
                                    ;CHECK TO SEND TO LU
276            INC    BITCNT        ;INCREMENT BIT COUNTER FOR
                                    ;RX DATA
278            MOV A,BITCNT
279            MOV    SHFT,A        ;SAVE BIT COUNT IN SHFT
280            MOV A,#01H           ;T1=0, T0=1, BIT=1
281            DJNZ SHFT,LOOP1
282            JMP    SHFTDONE
283   LOOP1    RL     A             ;SHIFT BIT TO PROPER LOCATION
284            DJNZ SHFT,LOOP1
285            ORL    A,RX          ;SAVE BIT IN RX
286            JMP    SHFTDONE
287   CHK1     JNT1   REST          ;IF T1=0, RESET BIT; IF
                                    ;T1=1, BIT=0
```

```
289            INC   BITCNT      ;INCREMENT BIT COUNTER FOR
                                 ;RX DATA
291            MOV   A,BITCNT
292            MOV   SHFT,A      ;SAVE BIT COUNT IN SHFT
293            DJNZ  SHFT,BIT0
294            CLR   A           ;FIRST BIT OF RX WORD IS 0
295            JMP   SHFTDONE
296   BIT0     MOV   ,#0FEH
297   LOOP     RL    A           ;SHIFT BIT TO PROPER LOCATION
298            DJNZ  SHFT,LOOP
299            ANL   A,RX        ;SAVE BIT IN RX
;SHFTDONE STORES THE RX INFO AND CHECKS HOW
;MANY BITS HAVE BEEN RECEIVED
305   SHFTDONE MOV   RX,A        ;SAVE RX WORD
306            ANL   P2,#0BFH    ;SET P26=0, ENABLE INT
                                 ;FOR IDLE BIT
307            MOV   A,BITCNT
308            XRL   A,#05H      ;BIT COUNT=5?
309            JZ    STATCHK     ;IF 0, CHECK FOR STATUS
                                 ;ADDRESS
310            MOV   A,BITCNT
311            XRL   A,#08H      ;BITCNT=8?
312            JNZ   RETRN       ;IF 0, SAVE ADDRESS
313            MOV   A, RX
314            MOV   R0,#ADDRS   ;SAVE THE RECEIVED ADDRESS
315            MOV   @R0,A
316            JMP   RETRN       ;RETURN FROM INTERRUPT
317   STATCHK  MOV   A,RX        ;LOAD ACC WITH RX ADDRESS
318            XRL   A,#1AH      ;COMPARE TO STATUS ADDRESS
319            JZ    STAT        ;IF 0, STATUS ADDRESS
320            MOV   A,#80H      ;LOAD BLANK WORD IN TX
                                 ;BUFFER
321            MOV   TX,A
322            JMP   RETRN       ;RETURN FROM INTERRUPT
323   STAT     CALL  LDFLG       ;CLEAR RFS FLAG 1
324            ANL   A,#0FDH     ;CLEAR RFS FLAG
325            MOV   @R0,A
326            SEL   RB1         ;RAM BANK 1
```

```
327             MOV    A,TXTMP       ;PUT KEY CODE IN TX BUFFER
328             SEL    RB0           ;RAM BANK 0
329             MOV    TX,A
330  RETRN      MOV    R1,#STOREG+1  ;RETRN RELOADS R1, R0
                                     ;BEFORE RETURNING FROM
                                     ; INTERRUPT
332             MOV    A,@R1
333             MOV    R0,A          ;RESTORE R0
334             DEC    R1
335             MOV    A,@R1
336             MOV    R1,A          ;RESTORE R1
337             MOV    A,HLDACC      ;RESTORE ACC
338             RETR                 ;RETURN FROM INTERRUPT
;RESET RESETS CONDITIONS WHEN TRANSMISSION FROM LU
;TO CU IS COMPLETE. IT ALSO SETS A FLAG INDICATING
;THAT RX DATA IS RECEIVED AND SAVES RECEIVED ADDRESS
;AND DATA IN ADRES AND RXDATA.
345  RESET      MOV    R0,#ADDRES    ;RX ADDRESS AND DATA
                                     ;RECEIVED
346             MOV    A,@R0
347             MOV    ADRES,A       ;SAVE RX ADDRESS
348             MOV    A,RX
349             MOV    RXDATA,A      ;SAVE RX DATA
350             CLR    A
351             MOV    BITCNT,A      ;CLEAR BITCNT
352             MOV    RX,A          ;CLEAR RX
353             ORL    P2,#40H       ;SET P26=1 TO ENABLE INT
                                     ;FOR RX DATA FOR NEXT
                                     ;TRANSMISSION
355             CALL   LDFLG
356             JB1    SETRFS        ;IS RFS FLAG SET?
357             ANL    P2,#7FH
358             JMP    SETFLG
359  SETRFS     ORL    P2,#80H       ;RESEND RFS
360  SETFLG     MOV    R0,#STACK+1   ;STACK ADDRESS WITH PSW
                                     ;(FLAG 0)
361             MOV    A,@R0         ;LOAD PSW IN ACC
362             ORL    A,#20H        ;SET FLAG 0=1, DATA IS RE-
                                     ;CEIVED
```

```
363            MOV    @R0,A       ;SAVE IN STACK
364            JMP    RETRN       ;RETURN FROM INTERRUPT

;IDLE CHECKS TO SEE IF DATA SHOULD BE SENT TO LU.
;THIS OCCURS AT BEGINNING OF IDLE (FALLING EDGE OF
;RX CLOCK).

370    IDLE    ORL    P2,#40H     ;SET P26=1 TO ENABLE INT FOR
                                  ;RX DATA
371            MOV    A,BITCNT
372            DEC    A
373            JZ     ENRFS
374            MOV    A,BITCNT
375            ANL    A,#0F8H     ;IS BITCNT GREATER OR
                                  ;=8?
376            JNZ    CULUP       ;IF NOT 0;GREATER OR =8
                                  ;OUTPUT DATA TO LU
378            JMP    RETRN       ;RETURN FROM INTERRUPT
379    PAGE 1  MOVP   A,@A        ;PART OF 8048 SELF TEST
380            RET
381    ENRFS   ANL    P2,#7FH     ;SEND LO TO LU-ENDS REQUEST
                                  ;FOR SERVICE
382            JMP    RETRN
```

We claim:

1. A method for enabling processing means to receive a block of binary data bits from first and second data signals generated by a signal source, the first and second data signals having a binary zero state before and after the block of data bits, the first data signal having the binary zero state and the second data signal having a binary one state for data bits having a binary zero state, the first data signal having a binary one state and the second data signal having the binary zero state for data bits having a binary one state, and the first and second data signals having the binary one state between successive data bits, said processing means generating a binary interrupt control signal initially having a binary one state, said method comprising for each data bit the steps of:

(a) generating data transition signal having a binary one state when the first and second data signals have different states and having a binary zero state when the first and second data signals have the same state;

(b) interrupting the processing means when the data transition signal and the interrupt control signal have the same state;

(c) storing the data bit in the processing means in response to said interrupting step, the first data signal and a binary one state of the interrupt control signal; and (d) changing the state of the interrupt control signal in response to the binary one state of the interrupt control signal.

2. The method according to claim 1, wherein the block of data bits includes an address portion having a first predetermined number of bits followed by a data portion having a second predetermined number of bits, said storing step (c) further including the steps of:

counting the number of times said processing means is interrupted by said interrupting step (b);

storing each of the data bits in an address register until the counted number of interrupts is substantially the same as the first predetermined number; and storing each of the following data bits in a data register until the counted number of interrupts is substantially the same as the sum of the first predetermined number and the second predetermined number.

3. The method according to claim 1, wherein said storing step (c) stores the data bit in response to said interrupting step, the first and second data signals and a binary one state of the interrupt control signal.

4. Apparatus for enabling processing means to receive a block of binary data bits from first and second data signals generated by a signal source, the first and second data signals having a binary zero state before and after the block of data bits, the first data signal having the binary zero state and the second data signal having a binary one state for data bits having a binary zero state, the first data signal having a binary one state and the second data signal having the binary zero state for data bits having a binary one state, and the first and second data signals having the binary one state between successive data bits, said apparatus comprising:

means coupled to the first and second data signals for generating a data transition signal having a binary one state when the first and second data signals have different states and having a binary zero state when the first and second data signals have the same state;

means coupled to the data transition signal generating means for generating an interrupt signal having a binary one state when the data transition signal and an interrupt control signal have the same binary state and otherwise having a binary zero state; and     processing means coupled to the interrupt signal generating means for producing the interrupt control signal initially having a binary one state, said processing means being responsive to the binary one state of the interrupt signal for storing a data bit when the interrupt control signal has the binary one state, and said processing means further being responsive to the binary one state of the interrupt signal for changing the binary state of the interrupt control signal.

5. The apparatus according to claim 4, wherein the data transition signal generating means is comprised of exclusive-OR gating means.

6. The apparatus according to claim 4, wherein the interrupt signal generating means is comprised of exclusive-OR gating means.

7. The apparatus according to claim 4, wherein the block of data bits includes an address portion having a first predetermined number of bits and a data portion having a second predetermined number of bits, and wherein said processing means further includes an address register, a bit counter and a data register, said processing means incrementing the bit counter by one in response to the binary one state of the interrupt signal, storing each of the data bits in the address register until the bit counter is substantially the same as the first predetermined number, and thereafter storing each of the data bits in the data register until the bit counter is substantially the same as the sum of the first predetermined number and the second predetermined number.

8. The apparatus according to claim 7, wherein said processing means includes a transmit data register having bits of a transmit data signal therein and a return data signal coupled to said transmit data register, said processing means shifting data bits in the transmit data register by one bit in response to the binary one state of the interrupt signal and the binary zero state of the interrupt control signal.

* * * * *